United States Patent
Takada et al.

(10) Patent No.: US 12,075,274 B2
(45) Date of Patent: Aug. 27, 2024

(54) USER EQUIPMENT AND MEASUREMENT METHOD

(71) Applicant: NTT DOCOMO, INC., Tokyo (JP)

(72) Inventors: Takuma Takada, Tokyo (JP); Naoki Fujimura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 82 days.

(21) Appl. No.: 17/441,541

(22) PCT Filed: Mar. 29, 2019

(86) PCT No.: PCT/JP2019/014339
§ 371 (c)(1),
(2) Date: Sep. 21, 2021

(87) PCT Pub. No.: WO2020/202396
PCT Pub. Date: Oct. 8, 2020

(65) Prior Publication Data
US 2022/0174529 A1 Jun. 2, 2022

(51) Int. Cl.
*H04W 24/10* (2009.01)
*H04W 76/15* (2018.01)
*H04W 88/06* (2009.01)

(52) U.S. Cl.
CPC .......... *H04W 24/10* (2013.01); *H04W 76/15* (2018.02); *H04W 88/06* (2013.01)

(58) Field of Classification Search
CPC ......... H04W 36/0072; H04W 36/0085; H04W 36/0058; H04W 24/02; H04W 36/0069;
(Continued)

(56) References Cited

U.S. PATENT DOCUMENTS 10,887,802 B2 * 1/2021 Teyeb ............... H04W 36/0072
11,178,564 B2 * 11/2021 Kim .................... H04W 76/16
(Continued)

FOREIGN PATENT DOCUMENTS

CN 106233765 A * 12/2016 ......... H04L 41/0816
CN 106233765 B * 11/2019 ......... H04L 41/0816
(Continued)

OTHER PUBLICATIONS

V. F. Monteiro, M. Ericson and F. R. P. Cavalcanti, "Fast-RAT Scheduling in a 5G Multi-RAT Scenario," in IEEE Communications Magazine, vol. 55, No. 6, pp. 79-85, Jun. 2017, doi: 10.1109/MCOM.2017.1601094. (Year: 2017).*
(Continued)

*Primary Examiner* — William D Cumming
(74) *Attorney, Agent, or Firm* — Osha Bergman Watanabe & Burton LLP

(57) ABSTRACT

Provided is a user equipment including: a receiving unit that receives at least one of configuration information of inter-radio access technology (RAT) measurement in a frequency range (FR) 2, configuration information of inter-RAT measurement other than the FR2, and configuration information of a measurement gap for each user equipment from a base station apparatus; and a control unit that performs the inter-RAT measurement other than the FR2 within the measurement gap for each user equipment and performs the inter-RAT measurement in the FR2 outside the measurement gap for each user equipment.

3 Claims, 10 Drawing Sheets

(58) Field of Classification Search
CPC ............ H04W 72/0453; H04W 24/08; H04W 36/249; H04W 36/0088; H04W 8/22; H04W 56/01
USPC ........................................ 455/456.1; 370/332
See application file for complete search history.

(56) References Cited

U.S. PATENT DOCUMENTS

| | | | | |
|---|---|---|---|---|
| 11,228,952 | B2* | 1/2022 | Ryoo | ............... H04W 36/0088 |
| 11,516,686 | B2* | 11/2022 | Zhang | ............... H04W 36/0085 |
| 11,540,155 | B2* | 12/2022 | Manolakos | ............ G01S 5/0221 |
| 2015/0257118 | A1* | 9/2015 | Siomina | .................. G01S 5/021 |
| | | | | 455/456.1 |
| 2017/0013623 | A1 | 1/2017 | Chin et al. | |
| 2017/0048108 | A1* | 2/2017 | Yi | ...................... H04L 41/0816 |
| 2017/0171771 | A1* | 6/2017 | Jung | ..................... H04W 24/10 |
| 2019/0222478 | A1* | 7/2019 | Yi | ......................... H04W 24/08 |
| 2020/0128453 | A1* | 4/2020 | Teyeb | ............... H04W 36/0069 |
| 2020/0162953 | A1* | 5/2020 | Kim | ....................... H04L 5/0051 |
| 2021/0014712 | A1* | 1/2021 | Zhang | .................. H04W 24/02 |
| 2021/0076268 | A1* | 3/2021 | Teyeb | ................... H04W 36/249 |
| 2022/0394574 | A1* | 12/2022 | Teyeb | ............. H04W 36/00698 |
| 2023/0013696 | A1* | 1/2023 | Teyeb | ................ H04W 36/0069 |
| 2023/0026600 | A1* | 1/2023 | Xie | ...................... H04W 56/001 |
| 2023/0156543 | A1* | 5/2023 | Xie | .................. H04W 36/0088 |
| | | | | 370/332 |
| 2023/0337034 | A1* | 10/2023 | Li | ........................... H04W 8/22 |

FOREIGN PATENT DOCUMENTS

| | | | | |
|---|---|---|---|---|
| CN | 114616859 | A * | 6/2022 | ............ H04W 24/10 |
| CN | 114930926 | A * | 8/2022 | ........ H04W 52/0216 |
| EP | 3091778 | A1 * | 11/2016 | ............ H04W 24/02 |
| EP | 3547753 | A1 * | 10/2019 | ......... H04L 41/0816 |
| JP | 2015-142235 | A | 8/2015 | |
| JP | 2017-508407 | A | 3/2017 | |
| JP | 6701091 | B2 * | 5/2020 | ......... H04L 41/0816 |
| WO | WO-2015167303 | A1 * | 11/2015 | ......... H04L 41/0816 |
| WO | WO-2023200628 | A1 * | 10/2023 | ............ H04W 24/10 |

OTHER PUBLICATIONS

International Search Report for corresponding International Application No. PCT/JP2019/014339, mailed Jun. 18, 2019 (11 pages).
Written Opinion for corresponding International Application No. PCT/JP2019/014339, mailed Jun. 18, 2019 (7 pages).
Qualcomm Incorporated; "LTE to FR2 gapless measurements"; 3GPP TSG-RAN WG2 Meeting #105, R2-1902688; Athens, Greece; Feb. 25-Mar. 1, 2019 (6 pages).
3GPP TS 38.300 V15.0.0; "3rd Generation Partnership Project; Technical Specification Group Radio Access Network; NR; NR and NG-RAN Overall Description; Stage 2 (Release 15)"; Dec. 2017 (68 pages).
3GPP TSG RAN #83; RP-190646 "Discussion on FR2 Gap-less Measurement in LTE SA" Intel Corporation; Shenzhen, China; Mar. 18-21, 2019 (7 pages).
Office Action issued in Japanese Application No. 2021-511769; Dated Oct. 11, 2022 (7 pages).
Office Action issued in Chinese Application No. 201980094669.2 issued on May 6, 2023 (19 pages).
Intel Corporation; "On UE measurement mode with gap for NSA"; 3GPP TSG-RAN4 Meeting #86bis, R4-1804198; Melbourne, Australia; Apr. 16-20, 2018 (4 pages).
Office Action issued in counterpart Japanese Patent Application No. 2022-194932 mailed on Jan. 30, 2024 (8 pages).
Intel Corporation; "Clarification on UE measurement mode during Mg"; 3GPP TSG-RAN4 Meeting #AH1807, R4-1808735; Montreal, Canada; Jul. 2-6, 2018 (6 pages).
H. Huawei; "CR for UE UL Tx behaviour after MG (section 9.1.2)"; 3GPP TSG-RAN4 Meeting #90, R4-1902553; Athens, Greece; Feb. 25-Mar. 1, 2019 (9 pages).
LG Electronics; "Corrections to description of Measurement gap and Measurement gap sharing configuration"; 3GPP TSG-RAN WG2 Meeting #105bis, R2-1904183; Xi'an, China; Apr. 8-12, 2019 (6 pages).
CMCC; "Assistance Information for EN-DC & NG-EN DC Gap Configuration"; 3GPP Tsg-Ran WG2 Meeting #105, R2-1901956; Athens, Greece; Feb. 25-Mar. 1, 2019 (4 pages).
Rejection Decision issued in counterpart Chinese Application No. 201980094669.2, mailed Mar. 25, 2024 (12 pages).

* cited by examiner

USER EQUIPMENT AND MEASUREMENT METHOD

TECHNICAL FIELD

The present invention relates to a user equipment and a measurement method in a radio communication system.

BACKGROUND ART

In the 3rd generation partnership project (3GPP), in order to further increase system capacity, increase data transmission rates, further reduce latency in a radio section, and the like, a radio communication system referred to as new radio (NR), or 5G, has been studied (for example, Non-Patent Document 1). With NR, in order to meet requirements stipulating that throughput of 10 Gbps or more have a latency of 1 ms or less in a radio section, various radio technologies have been studied.

For example, when the quality of a different frequency cell or the like is measured by a user equipment: a measurement gap is configured according to conditions; data transmission/reception is stopped in a serving cell during communication; and the quality measurement may be performed during the time when data transmission/reception is stopped.

A case has been discussed in the NR in which, when a user equipment connected to only an LTE measures a cell of an NR, the user equipment can measure the cell without configuring a measurement gap on an LTE side.

CITATION LIST

Non-Patent Document

Non-Patent Document 1: 3GPP TS 38.300 V15.0.0 (2017 December)

SUMMARY OF THE INVENTION

Problem to be Solved by the Invention

However, in a case where the user equipment can measure the cell without configuring a measurement gap on an LTE side when the user equipment connected to only an LTE measures a cell of an NR, it is unclear what kind of inter-frequency measurement is to be configured when the user equipment can measure the cell without the measurement gap.

The invention has been made in view of the above-described problems, and the invention is to provide a technique capable of appropriately determining what kind of inter-frequency measurement is to be configured in a case in which measurement can be performed without configuring a measurement gap on an LTE side, when a user equipment connected to only an LTE measures a cell in an NR.

Means for Solving Problem

According to the disclosed technology, there is provided a user equipment including: a receiving unit that receives at least one of configuration information of inter-RAT measurement in a frequency range (FR) 2, configuration information of inter-RAT measurement other than the FR2, and configuration information of a measurement gap for each user equipment from a base station apparatus; and a control unit that performs the inter-RAT measurement other than the FR2 within the measurement gap for each user equipment and performs the inter-RAT measurement in the FR2 outside the measurement gap for each user equipment.

According to another aspect, there is provided a user equipment including: a receiving unit that receives at least one of configuration information of inter-RAT measurement in an FR2, configuration information of inter-RAT measurement other than the FR2, and configuration information of a measurement gap for each user equipment from a base station apparatus; and a control unit that performs the inter-RAT measurement other than the FR2 and the inter-RAT measurement in the FR2 within the measurement gap for each user equipment.

According to another aspect, there is provided a user equipment including: a receiving unit that receives configuration information of inter-RAT measurement in an FR2 from a base station apparatus; and a control unit that performs the inter-RAT measurement in the FR2 without stopping data transmission/reception in a measurement gap for each user equipment or performs the inter-RAT measurement in the FR2 by stopping the data transmission/reception in the measurement gap for each user equipment, in a case where the measurement gap for each user equipment is configured.

According to another aspect, there is provided a user equipment including: a receiving unit that receives configuration information of inter-RAT measurement in an FR2 from a base station apparatus; and a control unit that performs the inter-RAT measurement in the FR2 without stopping data transmission/reception or performs the inter-RAT measurement in the FR2 by stopping the data transmission/reception according to a predetermined measurement gap pattern, in a case where the measurement gap for each user equipment is not configured.

Effect of the Invention

According to the disclosed technology, provided is a technology capable of appropriately determining what kind of inter-frequency measurement is to be configured in a case in which measurement can be performed without configuring a measurement gap on an LTE side, when a user equipment connected to only an LTE measures a cell in an NR.

MODE(S) FOR CARRYING OUT THE INVENTION

Hereinafter, embodiments (the present embodiments) of the invention will be described with reference to the drawings. In addition, the embodiments described below are exemplary ones, and the invention may be applied to embodiments other than those described below.

Although it is assumed that the radio communication system in the following embodiments basically conforms to the NR, this is only an example, and the radio communication system according to the present embodiment may partially or entirely includes a radio communication system (for example, LTE) other than the NR.

Overall System Configuration

Figure 1:
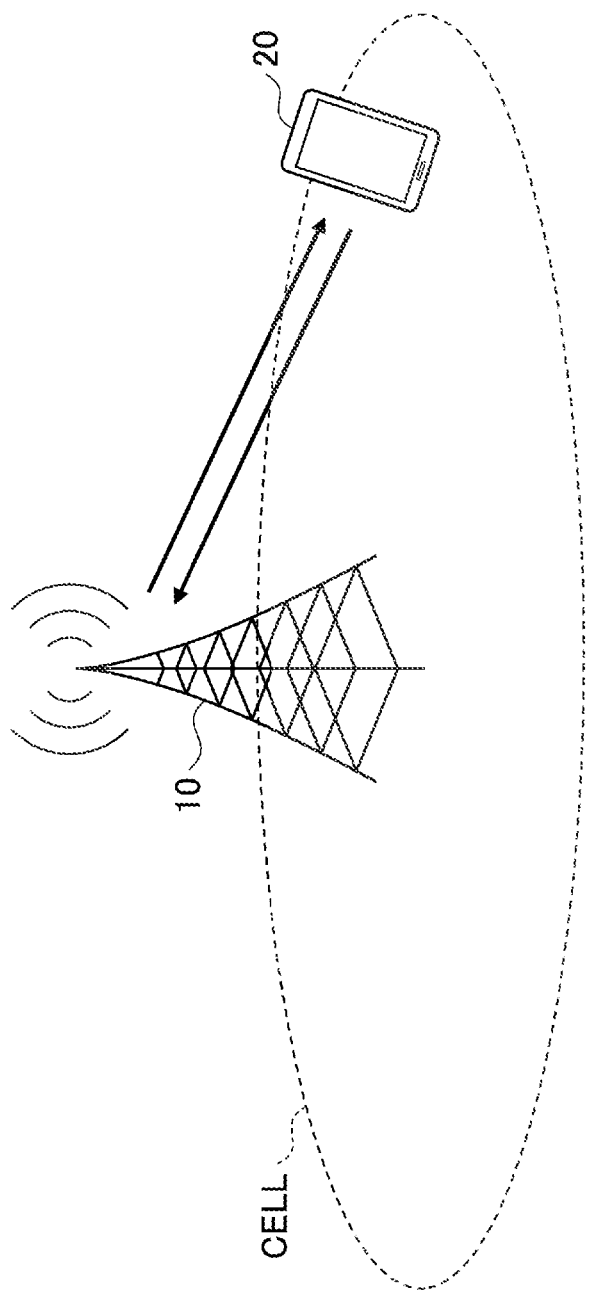
FIG. 1 is the configuration diagram of a communication system according to an embodiment of the invention.

FIG. 1 illustrates a configuration diagram of a radio communication system according to the present embodiment. As illustrated in FIG. 1, the radio communication system according to the present embodiment includes a base station apparatus 10 and a user equipment 20. FIG. 1 illustrates one base station apparatus 10 and one user equipment 20, but this is an example, and a plurality of base station apparatus and a plurality of the user equipments may be provided.

The user equipment 20 is a communication device having a radio communication function such as a smart phone, a mobile phone, a tablet, a wearable terminal, or a communication module for machine-to-machine (M2M), and the user equipment is connected to the base station apparatus 10 in a wireless manner to use various communication services provided by the radio communication system. The base station apparatus 10 is a communication device that provides one or more cells and communicates with the user equipment 20 in a wireless manner. Both the user equipment 20 and the base station apparatus 10 can transmit and receive signals by performing beamforming. In addition, the user equipment 20 may be referred to as a UE, and the base station apparatus 10 may be referred to as a gNB.

In the present embodiment, the duplex method may be a time division duplex (TDD) method or may be a frequency division duplex (FDD) method.

Since the technology according to the present embodiment relates to quality measurement and the measurement gap of a different frequency cell, first, the quality measurement and the measurement gap of the different frequency cell will be described.

Quality Measurement and Measurement Gap of Different Frequency Cell

For example, when the user equipment 20 is to measure the quality of the different frequency cell, by configuring the measurement gap according to conditions and stopping data transmission/reception in a serving cell during communication, it is possible to perform the quality measurement during the time when data transmission/reception is stopped.

In the NR, with respect to capability relating to the measurement gap, two types of measurement gaps are defined including a measurement gap for each user equipment 20 and a measurement gap for each FR.

Figure 2:
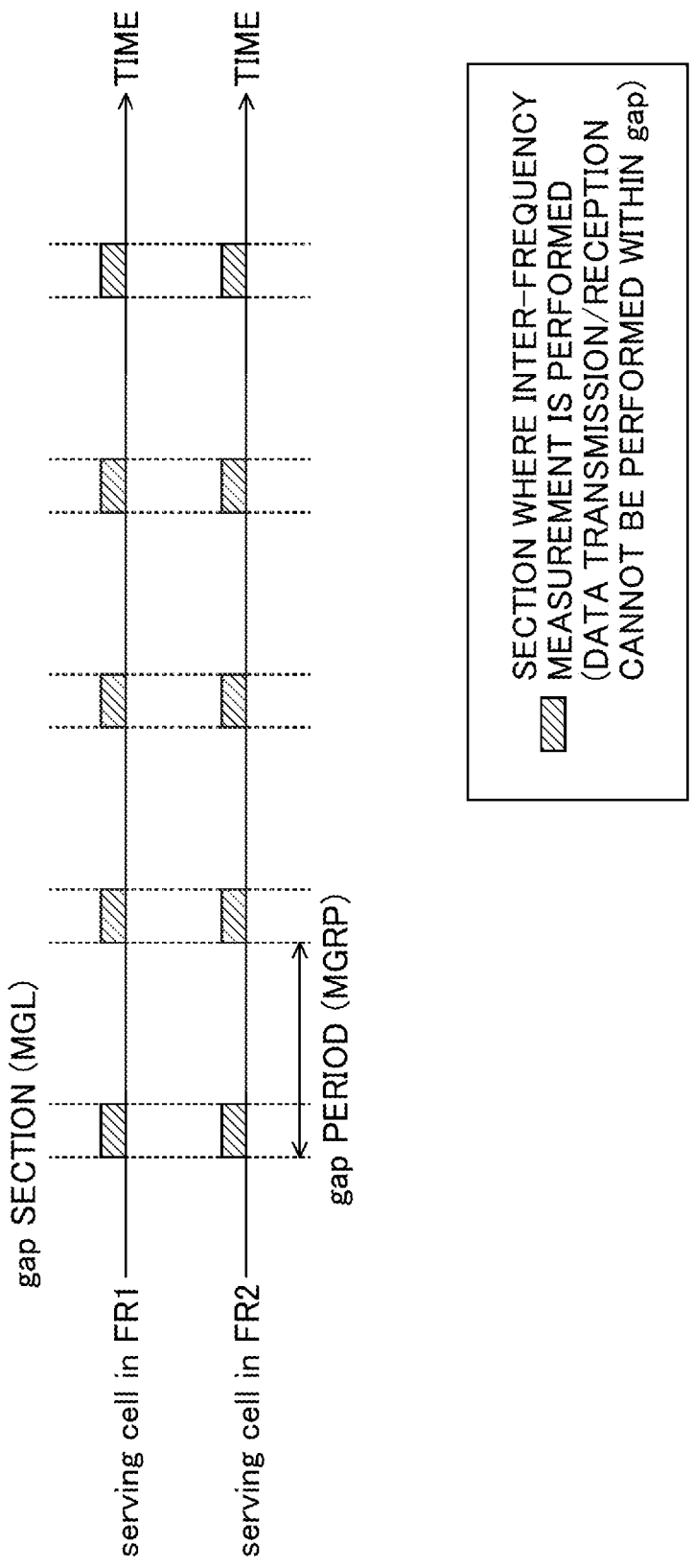
FIG. 2 is a diagram illustrating the measurement gap for each user equipment.

FIG. 2 is a diagram illustrating the measurement gap for each user equipment.

As illustrated in FIG. 2, in the measurement gap for each user equipment, one measurement gap can be configured by the user equipment 20, and one measurement gap common to all the configured inter-frequency/inter-RAT measurements is shared. In this case, the section where the inter-frequency measurement is performed is within the measurement gap, and the data transmission/reception in the serving cell is stopped within the measurement gap, irrespective of which inter-frequency being measured. In FIG. 2, the measurement gap section is also referred to as the measurement gap length (MGL). The measurement gap period is also referred to as the measurement gap repetition period (MGRP).

Figure 3:
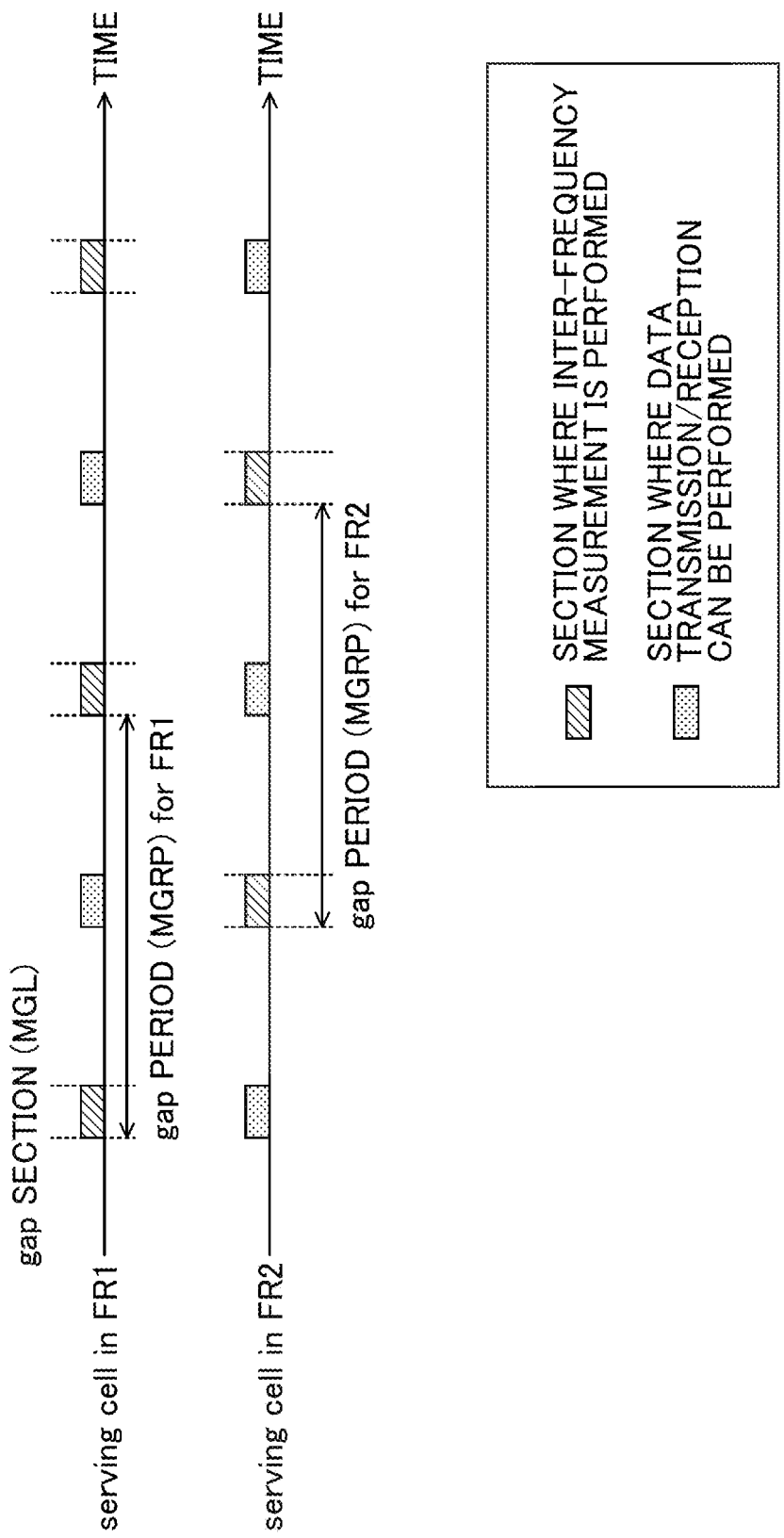
FIG. 3 is a diagram illustrating the measurement gap in frequency range (FR) units.

FIG. 3 is a diagram illustrating the measurement gap in frequency range (FR) units.

In the measurement gap for each FR, one measurement gap can be configured for each FR, and the measurement gap can be controlled independently for each FR. As illustrated in FIG. 3, for example, even if the measurement gap is configured on the FR1 side, there is no effect on the FR2 side; and the data transmission/reception in the FR2 can be performed in a section corresponding to the measurement gap configured on the FR1 side. In contrast, data transmission/reception in the FR1 is possible in a section corresponding to the measurement gap configured on the FR2 side.

Problems

When a candidate NR cell is to be measured in the state where there is no NR serving cell, a case where the NR cell can be measured without configuring the measurement gap on the LTE side has been discussed for the NR. As a candidate of such a case, for example, a case where the user equipment 20 corresponding to EN-DC measures a candidate cell in the FR2 before the execution of the EN-DC becomes a candidate case. In addition, the EN-DC denotes dual connectivity (DC) configured with a master node (MN) of an E-UTRA/LTE and a secondary node (SN) of the NR.

However, in such a candidate case, it is unclear what kind of the inter-frequency measurement is to be configured when measurement can be performed without the measurement gap. In addition, the relationship with the two types of capabilities relating to the measurement gaps (the measurement gap for each user equipment and the measurement gap for each FR) is also unclear. For example, in a case where the inter-frequency measurement in the FR1 or the LTE is configured in addition to the configuring of the inter-frequency measurement in the FR2, in the case of the user equipment 20 corresponding to the measurement gap for each user equipment, it is unclear whether the measurement in the FR2 can be performed without the measurement gap. In addition, in a case where the inter-frequency measurement in the FR1 or the LTE is configured in addition to the configuring of the inter-frequency measurement in the FR2, even in the case of the user equipment 20 coping with the measurement gap for each FR, it is unclear how the user equipment 20 operates in a case where the network configures the measurement gap for each user equipment. In addition, even in the case of the user equipment 20 coping with the measurement gap for each FR, because the measurement gap for each FR for the FR2 is configured from a secondary cell group (SCG) side, the measurement gap cannot be configured before the execution of the EN-DC.

In view of such a problem, the embodiment of the invention is to clarify a case where the user equipment 20 can perform the inter-frequency measurement without using the measurement gap in a case where the user equipment 20 is connected to only the LTE and is not connected to the NR cell, and to realize optimal network control in terms of efficient use of radio resources, scheduling, and the like.

First Embodiment

According to a first embodiment, it is considered that, for a user equipment 20 connected to only an LTE, in addition to configuring of inter-RAT measurement in an FR2, in a case where inter-frequency/inter-RAT measurement other than the FR2 (measurement in an FR1 and LTE/3G/2G) is configured by a network together with a measurement gap for each user equipment, the user equipment 20 performs only the measurement in the FR1 or the LTE/3G/2G within the measurement gap and performs the inter-RAT measurement in the FR2 without the measurement gap.

Figure 4:
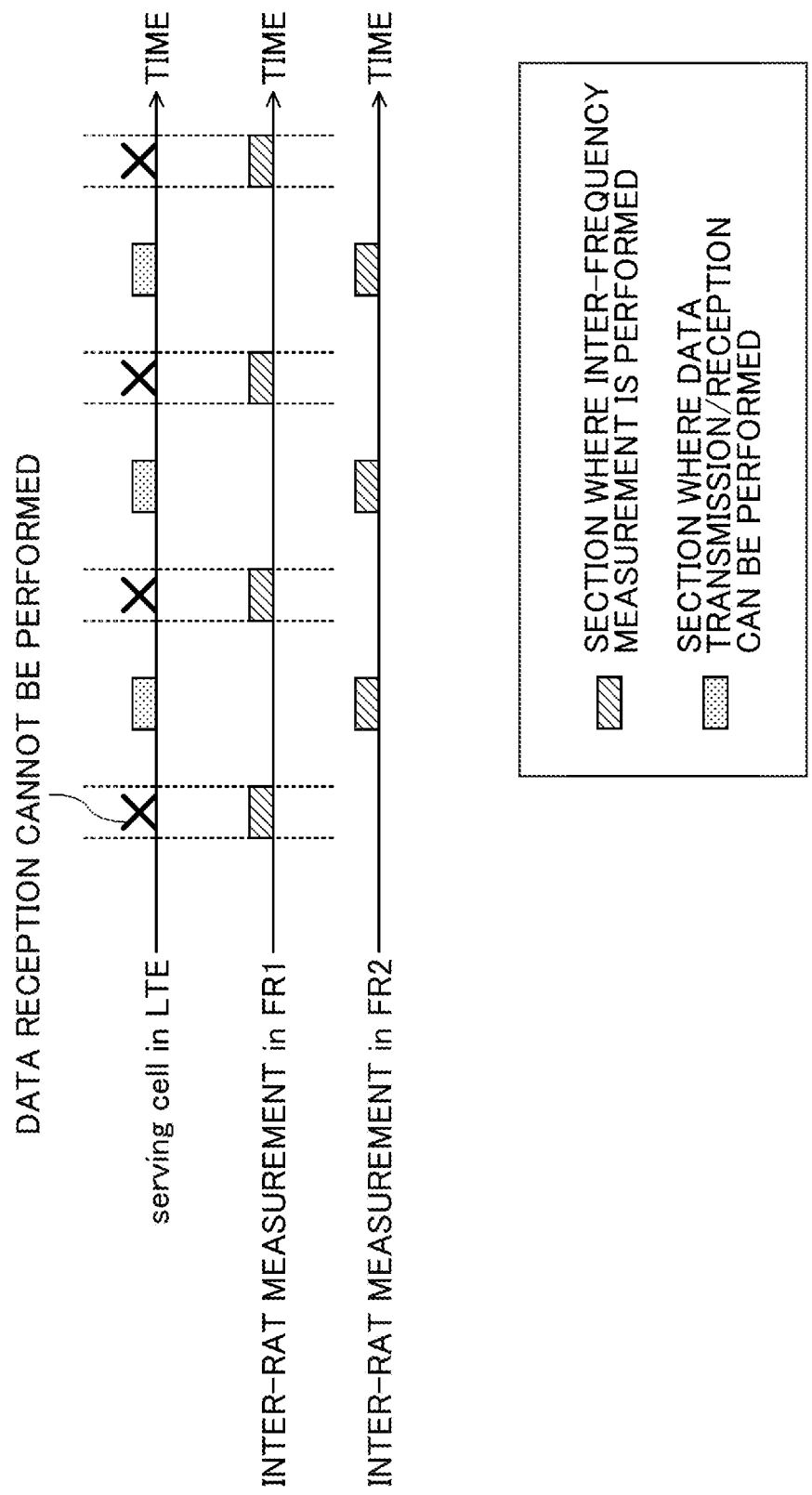
FIG. 4 is a diagram illustrating an example of performing inter-RAT measurement in the FR2 without using a measurement gap.
Figure 5:
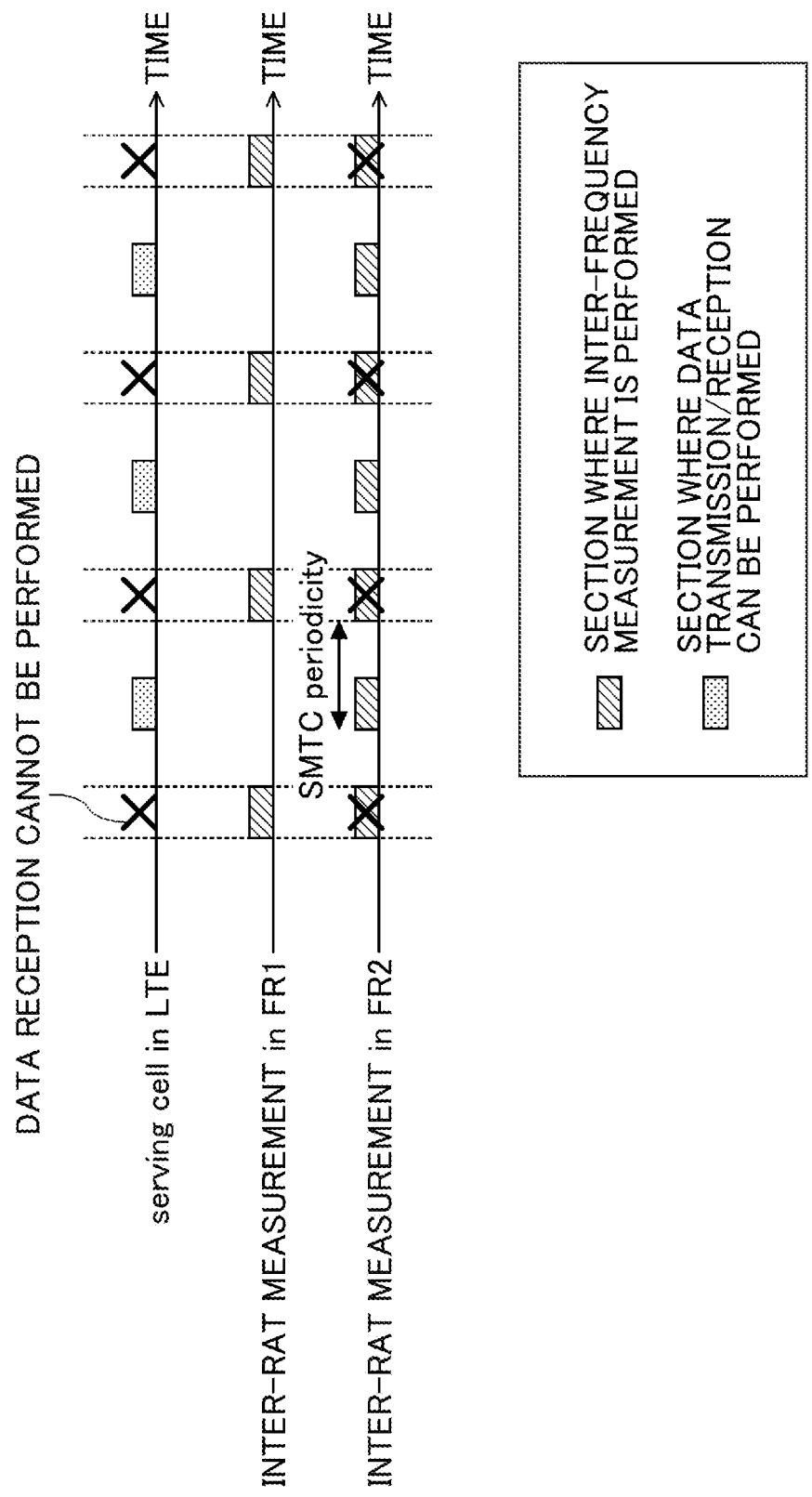
FIG. 5 is a diagram illustrating an example of performing inter-RAT measurement in the FR2 without using a measurement gap.

Herein, performing the inter-RAT measurement in the FR2 without the measurement gap may indicate that the network configures the inter-RAT measurement in the FR2 such that the timing of the measurement gap does not overlap with an SS block based RRM measurement timing configuration (SMTC) (refer to FIG. 4) or may indicate performing the inter-RAT measurement in the FR2 by using only the SMTC that does not overlap with the measurement gap (refer to FIG. 5). As illustrated in FIG. 4, during the inter-RAT measurement in the FR2, the data transmission/reception in the LTE serving cell is possible, whereas during the inter-RAT measurement in the FR1, the data transmission/reception in the LTE serving cell is not possible. As illustrated in FIG. 5, the user equipment 20 does not perform the inter-RAT measurement in the FR2 at a position overlapping with the measurement gap, and performs the inter-RAT measurement in the FR2 at a position that does not overlap with the measurement gap. Then, during the inter-RAT measurement in the FR2, the data transmission/reception in the serving cell in the LTE is possible.

Figure 6:
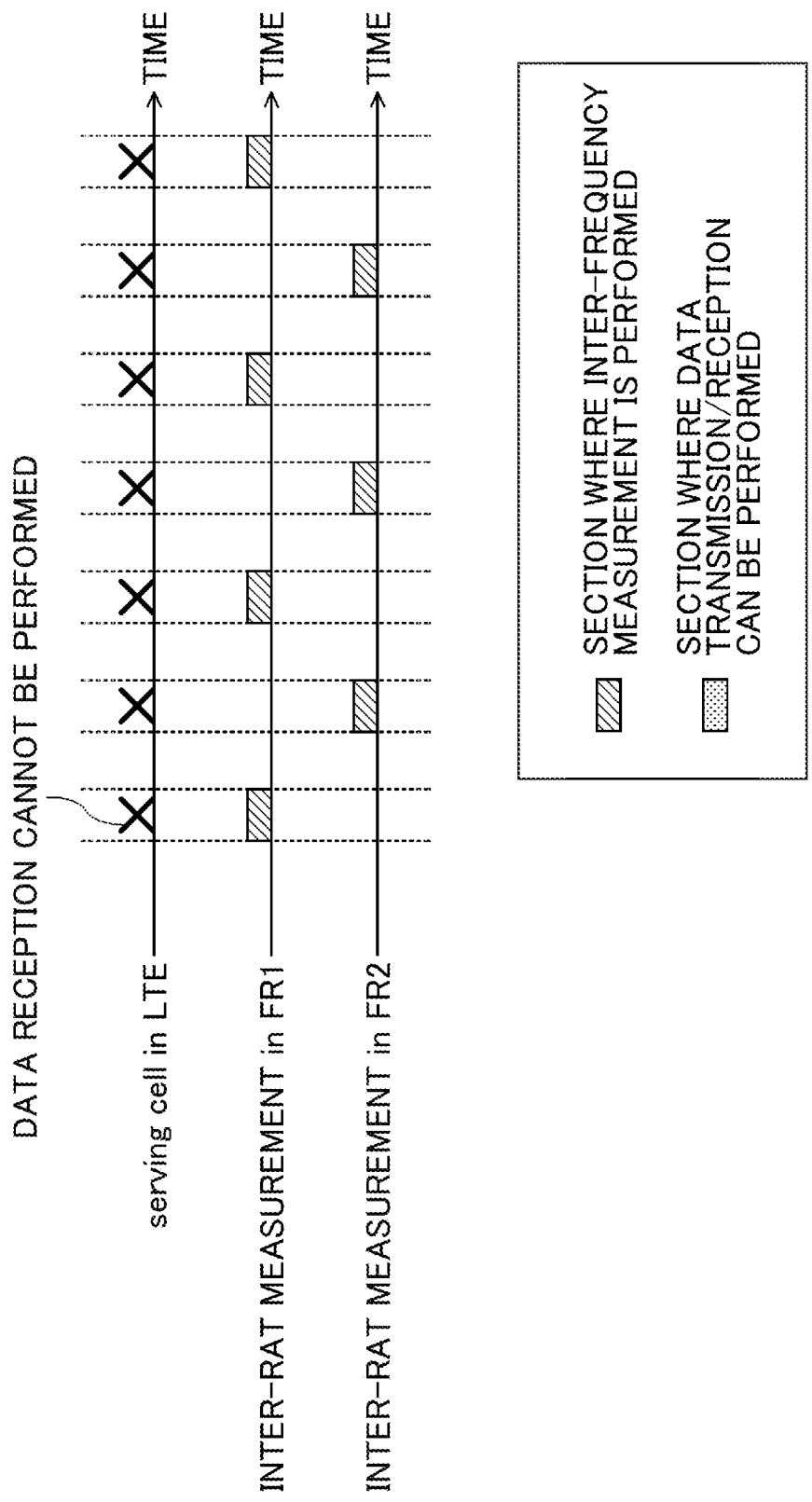
FIG. 6 is a diagram illustrating an example of performing inter-RAT measurement in the FR2 by using a measurement gap for each user equipment.

Alternatively, for the user equipment 20 connected to only the LTE, in addition to the configuring of the inter-RAT measurement in the FR2, in a case where the inter-frequency/inter-RAT measurement other than the FR2 (the measurement in the FR1 or the LTE/3G/2G) is configured by the network together with the measurement gap for each user equipment, the user equipment 20 may share the measurement gap with all the configured different frequencies/different RATS as defined by the measurement gap for each user equipment (refer to FIG. 6). As illustrated in FIG. 6, the data transmission/reception in the serving cell in the LTE is not possible even during the inter-RAT measurement in the FR1 or even during the inter-RAT measurement in the FR2.

In addition, whether the user equipment 20 operates as illustrated in FIGS. 4 and 5 or the user equipment 20 operates as illustrated in FIG. 6 may be determined on the basis of the capability of the user equipment relating to the measurement gap for each user equipment and the measurement gap for each FR or other capabilities.

Second Embodiment

Figure 7:
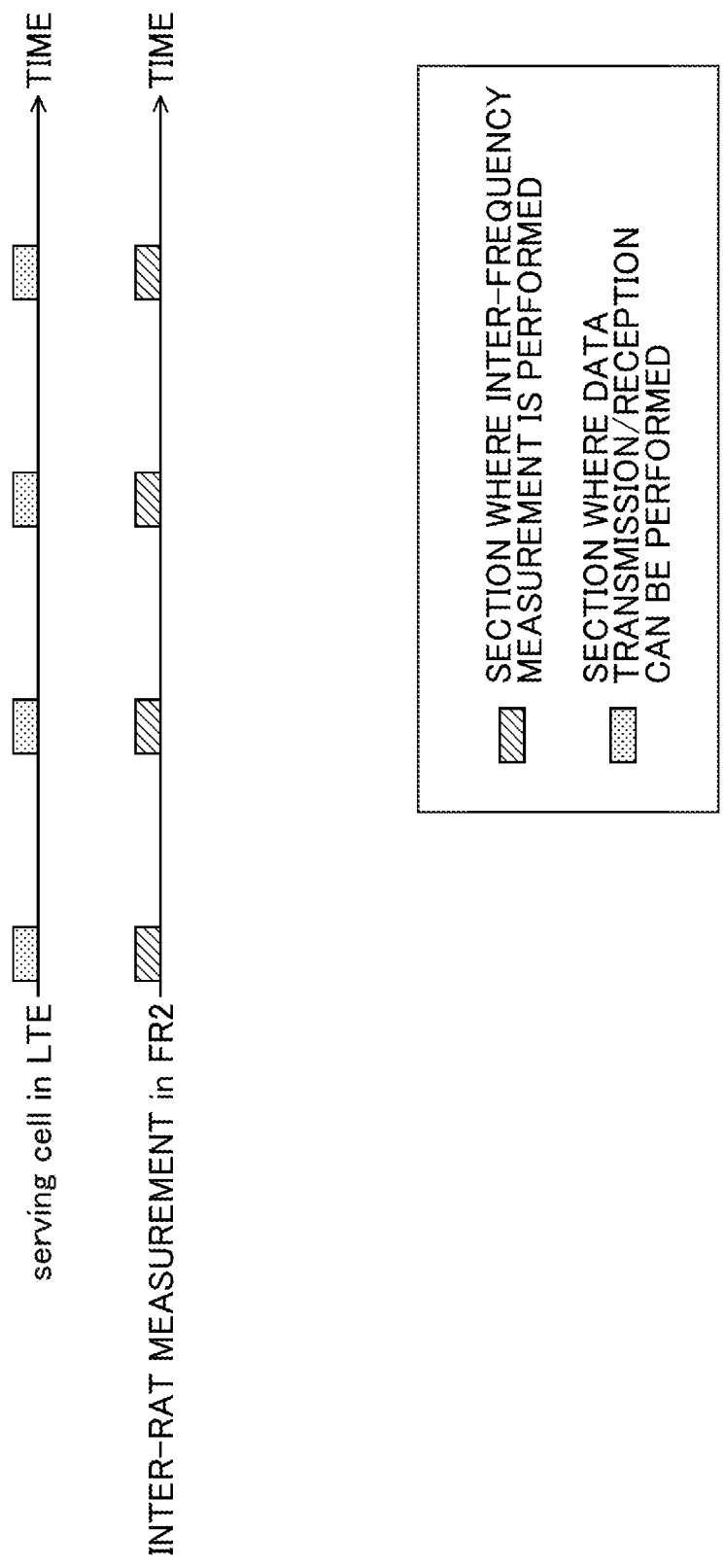
FIG. 7 is a diagram illustrating an example of performing measurement without using a measurement gap in a case where only inter-RAT measurement in an FR2 is configured.

According to a second embodiment, it is considered that, for a user equipment 20 connected to only an LTE, in a case where only inter-RAT measurement in an FR2 is configured and a measurement gap for each user equipment is configured, the user equipment 20 ignores the configuration of the measurement gap for each user equipment and performs measurement without the measurement gap (refer to FIG. 7). As illustrated in FIG. 7, the user equipment 20 may ignore the measurement gap for each user equipment and enable data transmission/reception in a serving cell in the LTE even during the inter-RAT measurement in the FR2. Herein, the "ignoring" of configuring the measurement gap denotes not configuring the measurement gap, operating under the assumption that the measurement gap is not configured, operating under the assumption that the value of the measurement gap is zero, and the like.

Figure 8:
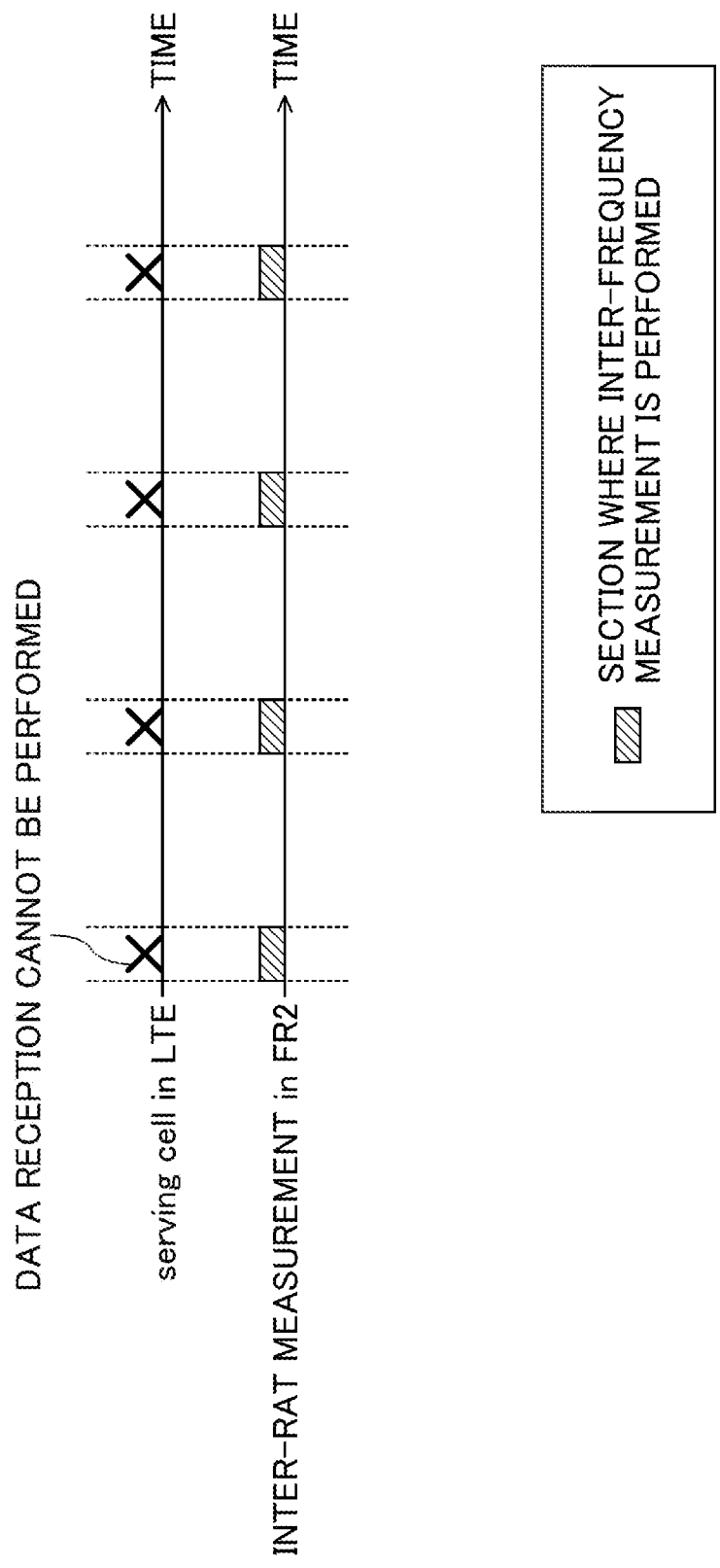
FIG. 8 is a diagram illustrating an example of performing measurement within a measurement gap in a case where only inter-RAT measurement in an FR2 is configured.

Alternatively, for the user equipment 20 connected to only the LTE, in a case where only the inter-RAT measurement in the FR2 is configured and the measurement gap for each user equipment is configured, the measurement gap for each user equipment may be provided as defined, and the inter-RAT measurement in the FR2 may be performed within the measurement gap for each user equipment (refer to FIG. 8). As illustrated in FIG. 8, the user equipment 20 performs the inter-RAT measurement in the FR2 within the measurement gap for each user equipment, and during the inter-RAT measurement in the FR2, the data transmission/reception in the serving cell in the LTE is not possible.

Whether the user equipment 20 operates as illustrated in FIG. 7 or the user equipment 20 operates as illustrated in FIG. 8 may be determined on the basis of the capability of the user equipment 20 relating to the measurement gap for each user equipment and the measurement gap for each FR or other capabilities.

It is considered that, for the user equipment 20 connected to only the LTE, in a case where only the inter-RAT measurement in the FR2 is configured and the measurement gap for each user equipment is not configured, the user equipment 20 is not provided with the measurement gap and performs the measurement without the measurement gap (refer to FIG. 7). As illustrated in FIG. 7, the user equipment 20 may enable the data transmission/reception in the serving cell in the LTE even during the inter-RAT measurement in the FR2. (Herein, "a case where the measurement gap for each user equipment is not configured" denotes that the measurement gap for each user equipment is to be configured by the network, but the configuration by the network is not performed.)

Alternatively, for the user equipment 20 connected to only the LTE, in a case where only the inter-RAT measurement in the FR2 is configured and the measurement gap for each user equipment is not configured, the user equipment 20 may assume a predetermined measurement gap pattern and perform the inter-RAT measurement in the FR2 (FIG. 8). For example, the user equipment 20 may assume one measurement gap pattern among 24 defined measurement gap patterns and perform the inter-RAT measurement in the FR2.

Whether the user equipment 20 operates as illustrated in FIG. 7 or the user equipment 20 operates as illustrated in FIG. 8 may be determined on the basis of the capability of the user equipment 20 relating to the measurement gap for each user equipment and the measurement gap for each FR or other capabilities.

Apparatus Configuration

Next, an example of a functional configuration of the base station apparatus 10 and the user equipment 20 that execute the processes and operations described above will be described. The base station apparatus 10 and the user equipment 20 include functions implementing the above-described embodiment. However, each of the base station apparatus 10 and the user equipment 20 may include only a portion of the functions in the embodiment.

Base Station Apparatus 10

Figure 9:
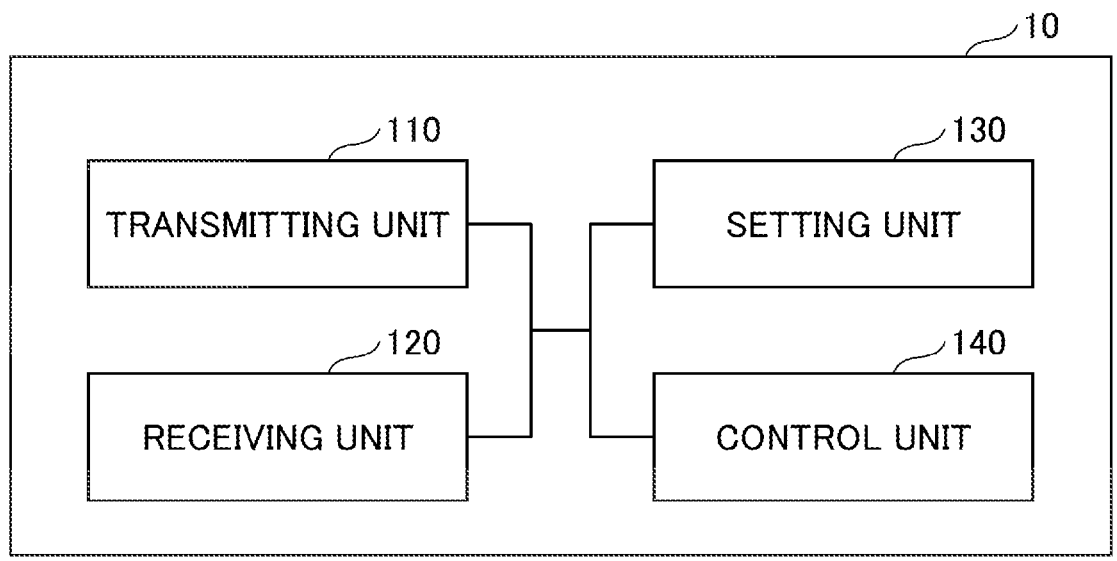
FIG. 9 is a diagram illustrating an example of the functional configuration of a base station apparatus 10.

FIG. 9 is a diagram illustrating an example of a functional configuration of the base station apparatus 10. As illustrated in FIG. 9, the base station apparatus 10 includes a transmitting unit 110, a receiving unit 120, a setting unit 130, and a control unit 140. The functional configuration illustrated in FIG. 9 is only an example. As long as the operations according to the embodiment of the invention can be executed, the name of the functional division and functional units may be any type.

The transmitting unit 110 includes a function of generating signals to be transmitted to the user equipment 20 side and transmitting the signal in a wireless manner. The receiving unit 120 includes a function of receiving various signals transmitted from the user equipment 20 and acquiring, for example, information of a higher layer from the received signal.

The setting unit 130 stores the configuration information that is configured in advance and various pieces of the configuration information to be transmitted to the user equipment 20 in a storage device and reads the configuration information from the storage device as required.

In the control unit 140, the functional units related to the signal transmission in the control unit 140 may be included in the transmitting unit 110, and the functional units related to the signal reception in the control unit 140 may be included in the receiving unit 120.

User Equipment 20

Figure 10:
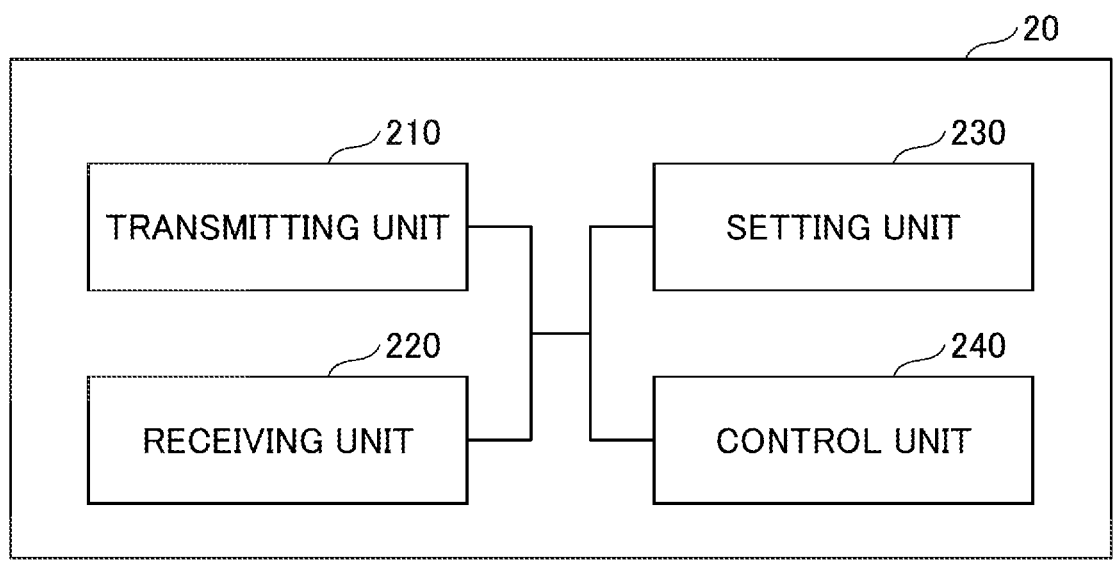
FIG. 10 is a diagram illustrating an example of the functional configuration of a user equipment 20.

FIG. 10 is a diagram illustrating an example of a functional configuration of the user equipment 20. As illustrated in FIG. 10, the user equipment 20 includes a transmitting unit 210, a receiving unit 220, a setting unit 230, and a control unit 240. The functional configuration illustrated in FIG. 10 is only an example. As long as it can perform the operation according to the embodiment of the invention, any suitable nomenclature for the functional divisions and functional units may be used.

The transmitting unit 210 generates a transmission signal from the transmission data and transmits the transmission signal in a wireless manner. The receiving unit 220 receives various signals in a wireless manner and acquires a signal of a higher layer from the received signals of a physical layer.

The setting unit 230 stores various pieces of the configuration information received from the base station apparatus 10 by the receiving unit 220 in the storage device and reads the configuration information from the storage device as required. In addition, the setting unit 230 also stores the configuration information that is configured in advance.

In the control unit 240, a functional unit related to the signal transmission in the control unit 240 may be included in the transmitting unit 210, and a functional unit related to the signal reception in the control unit 240 may be included in the receiving unit 220.

Hardware Configuration

The functional configuration diagrams (FIGS. 9 and 10) used in the description of the embodiments of the invention described above illustrate blocks of functional units. These functional blocks (components) may be implemented by any suitable combinations of hardware and/or software. In addition, the means for realizing each functional block are not particularly limited. That is, each functional block may be realized by a single apparatus obtained by physically and/or logically coupling a plurality of elements or may be realized by a plurality of apparatuses obtained by connecting directly and/or indirectly (for example, in wired and/or wireless manners) two or more apparatuses physically and/or logically separated.

Figure 11:
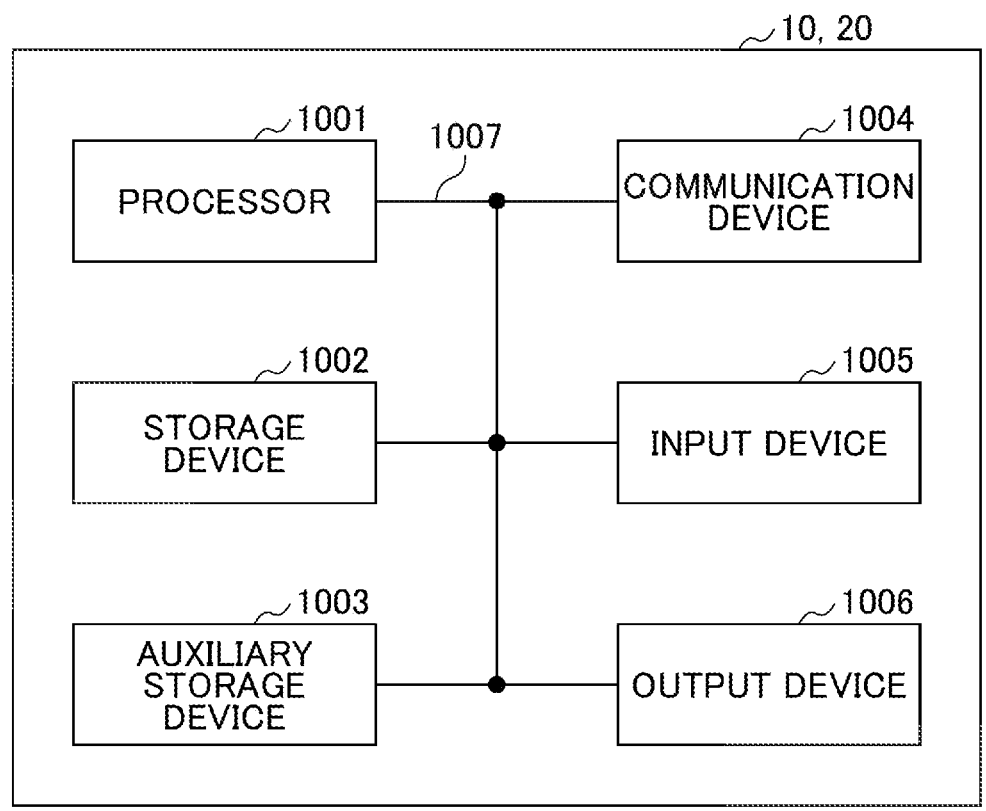
FIG. 11 is a diagram illustrating an example of the hardware configuration of a base station apparatus 10 and a user equipment 20.

In addition, for example, both the base station apparatus 10 and the user equipment 20 according to the embodiment of the invention may function as a computer for performing processing according to the embodiment of the invention. FIG. 11 is a diagram illustrating an example of a hardware configuration of the radio communication device that is the base station apparatus 10 or the user equipment 20 according to the embodiment of the invention. Each of the above-described base station apparatus 10 and user equipment 20 may be configured physically as a computer device including a processor 1001, a storage device 1002, an auxiliary storage device 1003, a communication device 1004, an input device 1005, an output device 1006, a bus 1007, and the like.

In addition, in the following description, the term "apparatus" can be replaced with circuit, device, unit, or the like in reading. The hardware configuration of the base station apparatus 10 and the user equipment 20 may be configured so that each apparatus includes one or a plurality of devices represented by 1001 to 1006 illustrated in the figure and may be configured so as not to include a portion of the devices.

Each function in the base station apparatus 10 and the user equipment 20 is realized by reading predetermined software (program) on hardware of the processor 1001, the storage device 1002, and the like allowing the processor 1001 to perform calculating, and controlling communication by the communication device 1004, reading and/or writing of data in the storage device 1002 and the auxiliary storage device 1003.

The processor 1001 controls the entire computer by operating, for example, an operating system. The processor 1001 may be configured by a central processing unit (CPU) including an interface with peripheral devices, a control device, an arithmetic device, a register, and the like.

In addition, the processor 1001 reads a program (program code), a software module, or a data from the auxiliary storage device 1003 and/or the communication device 1004 into the storage device 1002 and performs various processes in accordance with the program or the like. As the program, a program for allowing a computer to execute at least a portion of the operations described in the above embodiment is used. For example, the transmitting unit 110, the receiving unit 120, setting unit 130, and the control unit 140 of the base station apparatus 10 illustrated in FIG. 9 may be implemented by a control program that is stored in the storage device 1002 and runs on the processor 1001. In addition, for example, the transmitting unit 210, the receiving unit 220, the setting unit 230, and the control unit 240 of the user equipment 20 illustrated in FIG. 10 may be realized by a control program that is stored in the storage device 1002 and runs on the processor 1001. Various types of processing described above have been described to be executed by one processor 1001, but various types of processing may be executed simultaneously or sequentially by two or more processors 1001. The processor 1001 may be implemented by one or more chips. In addition, the program may be transmitted from the network via a telecommunication line.

The storage device 1002 is a computer-readable recording medium and may be configured with at least one of, for example, a read only memory (ROM), an erasable programmable ROM (EPROM), an electrically erasable programmable ROM (EEPROM), and a random access memory (RAM). The storage device 1002 may be referred to as a register, a cache, a main memory (main storage device), or the like. The storage device 1002 can store a program (program codes), a software module, or the like which can be executed for performing the processing according to the embodiment of the invention.

The auxiliary storage device 1003 is a computer-readable recording medium and may be configured with at least one of, for example, an optical disk of a compact disc ROM (CD-ROM) or the like, a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above-mentioned storage medium may be, for example, a database, a server, or other suitable media including the storage device 1002 and/or the auxiliary storage device 1003.

The communication device 1004 is hardware (transmission/reception device) for performing communication between computers via a wired network and a wireless network and is also referred to as, for example, a network device, a network controller, a network card, a communication module, or the like. For example, the transmitting unit 110 and the receiving unit 120 of the base station apparatus 10 may be realized by the communication device 1004. In addition, the transmitting unit 210 and the receiving unit 220 of the user equipment 20 may be realized by the communication device 1004.

The input device 1005 is an input device (for example, a keyboard, a mouse, a microphone, switches, buttons, sensors, or the like) that receives an external input. The output device 1006 is an output device (for example, a display, a speaker, an LED lamp, or the like). In addition, the input device 1005 and output device 1006 may have a configuration (for example, a touch panel) in which the input device 1005 and output device 1006 are integrated.

In addition, each device such as the processor 1001 and the storage device 1002 are connected by a bus 1007 for communicating information. The bus 1007 may be configured by a single bus or may be configured by a different bus for every device.

In addition, each of the base station apparatus 10 and the user equipment 20 may be configured to include hardware of a microprocessor, a digital signal processor (DSP), an application specific integrated circuit (ASIC), a programmable logic device (PLD), a field programmable gate array (FPGA), or the like, and a portion of or all of the functional blocks may be realized by the hardware. For example, the processor 1001 may be implemented by at least one of these hardware processors.

Summary of Embodiment

Heretofore, according to the present embodiment, there is provided a user equipment including: a receiving unit that receives at least one of a configuration of inter-RAT measurement in an FR2, a configuration of inter-RAT measurement other than the FR2, and a configuration of a measurement gap for each user equipment from a base station apparatus; and a control unit that performs the inter-RAT measurement other than the FR2 within the measurement gap for each user equipment and performs the inter-RAT measurement in the FR2 outside the measurement gap for each user equipment.

In addition, there is provided a user equipment including: a receiving unit that receives at least one of configuration information of inter-RAT measurement in an FR2, configuration information of inter-RAT measurement other than the FR2, and configuration information of a measurement gap for each user equipment from a base station apparatus; and a control unit that performs the inter-RAT measurement other than the FR2 and the inter-RAT measurement in the FR2 within the measurement gap for each user equipment.

In addition, there is provided a user equipment including: a receiving unit that receives configuration information of inter-RAT measurement in an FR2 from a base station apparatus; and a control unit that performs the inter-RAT measurement in the FR2 without stopping data transmission/reception in a measurement gap for each user equipment or performs the inter-RAT measurement in the FR2 by stopping the data transmission/reception in the measurement gap for each user equipment, in a case where the measurement gap for each user equipment is configured.

In addition, there is provided a user equipment including: a receiving unit that receives configuration information of inter-RAT measurement in an FR2 from a base station apparatus; and a control unit that performs the inter-RAT measurement in the FR2 without stopping data transmission/reception or performs the inter-RAT measurement in the FR2 by stopping the data transmission/reception according to a predetermined measurement gap pattern, in a case where the measurement gap for each user equipment is not configured.

With the above-described user equipment, a technology is provided that is capable of appropriately determining what kind of inter-frequency measurement is to be configured when measurement is possible without configuring a measurement gap on an LTE side, in cases where a user equipment connected to only an LTE is to measure a cell in an NR.

Supplement to Embodiment

Heretofore, although the embodiments of the invention have been described, the disclosed invention is not limited to the embodiments, and various modifications may be made to the described examples, or the like will be understood by those skilled in the art. Although the invention has been described with reference to specific numerical examples in order to facilitate the understanding of the invention, these values are simply illustrative, but any suitable values may be used unless otherwise noted. The distinction of items in the above description is not essential to the invention, matters described in two or more items may be used in combination as required, and matters described in a certain item may be applied to matters described in another item (unless inconsistent). Boundaries of the functional units or the processing units in the functional block diagram do not necessarily correspond to the boundaries of the physical components. The operations of a plurality of functional units may be performed physically by a single component, or the operations of a single functional unit may be physically performed by a plurality of components. In the processing procedure described in the embodiments, the order of the processing may be changed unless inconsistent. For the convenience of description of the processing, although the base station apparatus 10 and the user equipment 20 has been described by using functional block diagrams, but these apparatuses may be realized in hardware, software, or a combination thereof. Each of the software operated by a processor included in the user equipment 20 according to the embodiment of the invention and the software operated by a processor included in the base station apparatus 10 according to the embodiment of the invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

In addition, the information indication is not limited to the aspect/embodiment described in this specification, but the information indication may be performed by using other methods. For example, the information indication may be performed by physical layer signaling (for example, downlink control information (DCI) or uplink control information (UCI)), higher layer signaling (for example, radio resource control (RRC) signaling or medium access control (MAC) signaling, broadcast information (master information block (MIB) or system information block (SIB)), other signals, or a combination thereof. In addition, the RRC signaling may be referred to as an RRC message, and the RRC message may be, for example, an RRC connection setup message, an RRC connection reconfiguration message, or the like.

Each aspect/embodiment described in this specification may be applied to at least one of long term evolution (LTE), LIE-advanced (LTE-A), SUPER 3G, IMT-advanced, 4th generation mobile communication system (4G), 5th generation mobile communication system (5G), future radio access (FRA), new radio (NR), W-CDMA (registered trademark), GSM (registered trademark), CDMA2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using other suitable system, and/or a next-generation system extended on the basis of the above-mentioned ones.

In the processing procedure, sequence, flowchart, and the like in each aspect/embodiment described in this specification, the order may be changed unless inconsistent. For example, for the method described in this specification, elements of the various steps are presented by an exemplary order, and the invention is not limited to the presented specific order.

In this specification, in some cases, a specific operation described as being performed by the base station apparatus 10 may also be performed by the upper node. In a network configured with one network node or a plurality of network nodes included in the base station apparatus 10, it is apparent that various operations performed for communication with the user equipment 20 may be performed by the base station apparatus 10 and/or network nodes (for example, MME, S-GW or the like is considered, but the network nodes are not limited thereto) other than the base station apparatus 10. A case where there is one network node other than the base station apparatus 10 is exemplified in the above description, there may be a combination of a plurality of other network nodes (for example, MME and S-GW).

Each aspect/embodiment described in this specification may be used alone, may be used in combination, or may be used with being switched in accordance with the execution.

In some cases, the user equipment 20 may also be referred by those skilled in the art as a subscriber station, a mobile unit, a subscriber unit, a radio unit, a remote unit, a mobile device, radio device, radio communications device, a remote device, a mobile subscriber station, an access terminal, a mobile terminal, a radio terminal, a remote terminal, a handset, a user agent, a mobile client, a client, or other suitable terms.

In some cases, the base station apparatus 10 may also be referred by those skilled in the art as a node B (NB), an evolved Node B (eNB), a gNB, a base station, or other suitable terms.

In some cases, the terms "determining" and "deciding (determining)" used in this specification may include various types of operations. The "determining" and "deciding" may include, for example, judging, calculating, computing, processing, deriving, investigating, searching (looking up) (for example, looking up in a table, searching in a database or another data structure), and checking (ascertaining) that have been considered to be "determining" or "deciding". In addition, the "determining" and "deciding" may include receiving (for example, receiving information), transmitting (for example, transmitting information), inputting, outputting, and accessing (for example, accessing data in a memory) that have been considered to be "determining" or "deciding". In addition, the "determining" and "deciding" may include resolving, selecting, choosing, establishing, and comparing that have been considered to be "determining" or "deciding". In other words, the "determining" and "deciding" may include some operation that has been considered to be "determining" or "deciding".

The phrase "on the basis of" as used in this specification does not denote "on the basis of only" unless specifically stated otherwise. In other words, the phrase "on the basis of" denotes both "on the basis of only" and "on the basis of at least".

As long as the terms "include", "including", and variations thereof are used in this specification and the claims, these terms are intended to be exhaustive similarly to the term "comprising". Furthermore, the term "or" used in this specification and the claims is intended not to be exclusive OR.

Throughout the present closure, for example, in a case where articles "a", "an", and "the" in English are added in the translation, these articles may include a plurality of articles unless it clearly indicated from the context.

Heretofore, although the invention has been described in detail, it is obvious to those skilled in the art that the invention is not limited to the embodiments described in this specification. The invention can be carried out as modified and changed modes without departing from the scope of the invention defined by the appended claims. Accordingly, the description of this specification is intended to make exemplary description, but not intended to have any restrictive meaning with respect to the invention.

EXPLANATIONS OF LETTERS OR NUMERALS

10 BASE STATION APPARATUS
110 TRANSMITTING UNIT
120 RECEIVING UNIT
130 SETTING UNIT
140 CONTROL UNIT
20 USER EQUIPMENT
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE

1004 COMMUNICATION DEVICE
1005 INPUT DEVICE
1006 OUTPUT DEVICE

The invention claimed is:

1. A terminal that communicates with a base station apparatus configured to communicate with a plurality of terminals that includes the terminal, the terminal comprising:
   a receiver that receives, from the base station apparatus:
      configuration information of inter-radio access technology (RAT) measurement in a frequency range (FR) 2;
      configuration information of inter-RAT measurement other than the FR2; and
      configuration information of a measurement gap for each of the plurality of terminals; and
   a processor that, based on a capability of the terminal relating to the measurement gap for each of the plurality of terminals and a measurement gap for each FR, performs measurement within the measurement gap, upon reception of: the configuration information of the inter-RAT measurement in the FR2; the configuration information of the inter-RAT measurement other than the FR2; and the configuration information of the measurement gap.

2. A terminal, configured to communicate using a plurality of frequency ranges, with a base station apparatus configured to communicate with a plurality of terminals that includes the terminal, the terminal comprising:
   a receiver that receives, from the base station apparatus:
      configuration information of inter-radio access technology (RAT) measurement in a frequency range (FR) 2; and
      configuration information of a measurement gap for each FR; and
   a processor that, based on a capability of the terminal relating to a measurement gap for each of the plurality of terminals and the measurement gap for each FR, performs measurement without a gap upon reception of: the configuration information of the inter-RAT measurement in the FR2; and the configuration information of the measurement gap.

3. A measurement method of a terminal that communicates with a base station apparatus configured to communicate with a plurality of terminals that includes the terminal, the method comprising:
   receiving, from the base station apparatus:
      configuration information of inter-radio access technology (RAT) measurement in a frequency range (FR) 2;
      configuration information of inter-RAT measurement other than the FR2; and
      configuration information of a measurement gap for each of the plurality of terminals; and
   performing, based on a capability of the terminal relating to the measurement gap for each of the plurality of terminals and a measurement gap for each FR, measurement within the measurement gap, upon reception of: the configuration information of the inter-RAT measurement in the FR2; the configuration information of the inter-RAT measurement other than the FR2; and the configuration information of the measurement gap.

* * * * *